United States Patent Office 3,541,029
Patented Nov. 17, 1970

3,541,029
ELECTRICALLY CONDUCTIVE ZINC OXIDE
Robert S. Bowman, Pittsburgh, Pa., assignor to St. Joseph Lead Company, New York, N.Y., a corporation of New York
No Drawing. Filed June 29, 1967, Ser. No. 649,852
Int. Cl. H01b 1/06
U.S. Cl. 252—519                      6 Claims

ABSTRACT OF THE DISCLOSURE

Normally nonconductive zinc oxide is converted into colored electrically conductive forms by heating the zinc oxide with an oxide of a transition metal of the group consisting of iron, cobalt, nickel and copper, or a precursor thereof convertible into such oxide under the conditions of treatment. The products have both colorant and antistatic properties.

---

The invention relates to the production of colored electrically conductive zinc oxides.

I have found that normally nonconductive zinc oxide, either French or American process, can be converted into colored electrically conductive forms by heating the zinc oxide for a relatively short time to a temperature in the range of from about 600° C. to about 900° C. in admixture with an oxide of a transition metal of the group consisting of iron, cobalt, nickel and copper (atomic numbers 26 through 29) or a precursor thereof convertible into such oxide under the conditions of treatment.

Preferably the heating is carried out in a reducing atmosphere such as hydrogen or carbon monoxide or a mixture of nitrogen with hydrogen or carbon monoxide, for example, in the proportion of from about 5 to about 50 mole percent of hydrogen or carbon monoxide.

The activating substances are used in relatively small proportions of the order of from about 0.01 to about 5.0 atom percent based on the zinc oxide and, in general, amounts of the activating substances in the range of from about 0.03 to about 1.0 atom percent are preferred. The oxides or their precursors may be mixed with the zinc oxide in dry form prior to the heating operation. Preferably such mixtures are sprayed with water in the mixer in an amount, for example, of about 5 parts by weight of water to 20 parts by weight of the mixture to give a damp powder which is dried in air before being heated. The nitrates of the transition metals are particularly suitable as they are easily mixed with the zinc oxide as aqueous solutions and are readily converted to the oxides of the metals by thermal decomposition, at or below the processing temperatures. The nitrates are preferably dissolved in water, for example, in about 5 parts by weight of water to 20 parts by weight of zinc oxide and the solution sprayed on the zinc oxide in the mixer to give a damp powder which is air dried before being heated.

The heating of the mixture of zinc oxide and activating agent may be carried out in refractory reactor tubes either batchwise or in continuous flow through the reactor tubes. In general, a heating period of about 15 minutes is sufficient. The product is preferably allowed to cool to room temperature in a neutral or reducing atmosphere.

The following table gives illustrative examples of the method of the invention carried out with various activating agents:

| Activator | Atom, percent activator | Color | D.C. resistivity, ohm-cm, |
|---|---|---|---|
| $Fe(NO_3)_3$ | 0.6 | Dark yellow | $1.8 \times 10^3$ |
| $Co(NO_3)_2$ | 0.6 | Dark green | $2.3 \times 10^3$ |
| $Ni(NO_3)_2$ | 0.6 | Dark gray | 15 |
| $Cu(NO_3)_2$ | 0.6 | Purple | $5.5 \times 10^3$ |

In each of the examples the heating was carried out at 900° C. in an atmosphere of nitrogen containing about 50 mole percent hydrogen.

The products are useful as colorant-antistats in a variety of compositions such as synthetic fibers, polymers, elastomers, paper and the like where both color and antistatic properties are desired.

The term "atom percent" as used in the specification and claims hereof designates the atoms of activator metal per 100 molecules of zinc oxide.

What is claimed is:

1. A method of preparing colored electrically conductive zinc oxide which comprises heating zinc oxide to a temperature of from about 600° C. to about 900° C. in a reducing atmosphere in admixture with an oxide of iron, cobalt, nickel or copper or a precursor thereof convertible into such oxide under the conditions of treatment in an amount equivalent to from about 0.01 to about 5.0 atom percent based on the zinc oxide.

2. A method as defined in claim 1 wherein the amount of oxide or precursor thereof is equivalent to from about 0.03 to about 1.0 atom percent.

3. A method as defined in claim 1 wherein the activating substance is $Fe(NO_3)_3$.

4. A method as defined in claim 1 wherein the activating substance is $Co(NO_3)_2$.

5. A method as defined in claim 1 wherein the activating substance is $Ni(NO_3)_2$.

6. A method as defined in claim 1 wherein the activating substance is $Cu(NO_3)_2$.

References Cited

UNITED STATES PATENTS

| 2,887,632 | 5/1959 | Dalton | 252—512 |
| 3,089,856 | 5/1963 | Cyr | 252—501 |
| 3,264,229 | 8/1966 | Klein | 252—518 |

OTHER REFERENCES

Paragraph 36735r, Chemical Abstracts, vol. 67, 1967.

DOUGLAS J. DRUMMOND, Primary Examiner

U.S. Cl. X.R.
23—147; 106—296